United States Patent
Horiuchi et al.

(10) Patent No.: US 6,805,505 B2
(45) Date of Patent: Oct. 19, 2004

(54) KEYBOARD AND COMPUTER SYSTEM ALLOWING FOR SIMPLE KEYBOARD REMOVAL

(75) Inventors: Mitsuo Horiuchi, Sagamihara (JP); Hiroyuki Noguchi, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/254,618

(22) Filed: Sep. 25, 2002

(65) Prior Publication Data

US 2003/0059242 A1 Mar. 27, 2003

(30) Foreign Application Priority Data

Sep. 25, 2001 (JP) ........................................ 2001-291257

(51) Int. Cl.[7] ............................................ G06F 3/023
(52) U.S. Cl. ...................................................... 400/472
(58) Field of Search ........................ 400/472; 345/168; 341/22; 361/680

(56) References Cited

U.S. PATENT DOCUMENTS

| | | | | |
|---|---|---|---|---|
| 4,333,155 A | * | 6/1982 | Johnston | ..................... 361/680 |
| 5,144,302 A | * | 9/1992 | Carter et al. | ................... 341/20 |
| 5,510,953 A | * | 4/1996 | Merkel | ....................... 361/680 |
| 6,064,564 A | * | 5/2000 | Song et al. | ................. 361/680 |
| 6,618,936 B2 | * | 9/2003 | Bovio et al. | ................... 29/832 |

FOREIGN PATENT DOCUMENTS

| | | | | | |
|---|---|---|---|---|---|
| EP | 425170 A | * | 5/1991 | | ........... A47B/43/00 |
| JP | 05189084 A | * | 7/1993 | | ............. G06F/1/16 |

* cited by examiner

*Primary Examiner*—Daniel J. Colilla
(74) *Attorney, Agent, or Firm*—Scott W. Reid

(57) ABSTRACT

In a personal computer, preferably a lap-top-type personal computer, first latch members (or sections) and second latch members (or sections) are provided on a bezel surrounding a periphery of a keyboard. The first and second latch members serve to support one side of the keyboard. By having a bottom surface of the second latch members made a sloping surface, when a user pushes the keyboard upward with a finger from below the keyboard slides backward at a slope without interfering with the first latch members. As such, the front part of the keyboard is released from the latching by the first latch members and the second latch members and can be easily and simply removed.

15 Claims, 7 Drawing Sheets

(a)

(b)

(a)

(b)

KEYBOARD AND COMPUTER SYSTEM ALLOWING FOR SIMPLE KEYBOARD REMOVAL

FIELD OF THE INVENTION

The present invention relates to laptop computers and other devices having a keyboard as an integral component and more particularly to devices wherein ease of removal of the keyboard is desirable.

BACKGROUND OF THE INVENTION

As shown in FIG. 7, a notebook PC has a configuration in which a monitor section 1 displaying an image and a main body 3 provided with a keyboard section 2 are linked so as to allow opening and closing. The main body 3 comprises a housing 4 called a clamshell that forms a shell with the monitor section 1 and main body 3 folded together, a bezel 5 fitted around the keyboard section 2 with the monitor section 1 and main body 3 open, and a keyboard section 2, and is configured such that a motherboard, HDD, memory, and so forth, are incorporated in the internal space A enclosed by the housing 4, bezel 5, and keyboard section 2.

The keyboard section 2 is a unit formed by the attachment of a plurality of keys 6 and circuit boards (not shown) to a base panel 7. Conventionally, in many cases this kind of keyboard section 2 is fixed as an entity to the bezel 5 by means of screws, etc. With this kind of construction, the keyboard section 2 is generally fixed with screws from the rear side (the internal space A side) of the bezel 5.

With this kind of conventional construction it is necessary to remove the bezel 5 from the housing 4 in order to remove the keyboard section 2, and it is not anticipated that the keyboard section 2 will be removed after shipment.

These days, however, PC customization is widely carried out, including memory expansion, HDD replacement, and incorporation of expansion devices. Consequently, PC manufacturers' customer service representatives and PC retail outlets may receive such requests from users, or users themselves may undertake such customization. There is thus a desire for a construction that allows even an inexperienced service representative or user to easily remove the keyboard section 2.

Some recent models allow easy removal of the keyboard section 2 from the housing 4 and bezel 5. FIG. 7 shows an example of a PC that has a construction that allows the keyboard section 2 to be removed from the bezel 5 with a one-touch operation. This PC is configured so that the two mutually opposing sides of the keyboard section 2 are latched by latch sections 10 and 11 formed on the bezel 5. Also, receiving sections 12 and 13 are provided at positions corresponding to latch sections 10 and 11 in order to support the keyboard section 2. The keyboard section 2 is arranged so as to be held with its front part 2a and rear part 2b sandwiched above and below by receiving sections 12 and 13 and latch sections 10 and 11.

In the fitted state, the keyboard section 2 is positioned with, for example, the front part 2a pressed against a stopper 14 formed on receiving section 12. Therefore, a pin 15 projecting downward is formed on the keyboard section 2, and a positioning claw is provided at a position corresponding to the pin 15. By means of the force of the positioning claw 16 arising due to elastic deformation, pressure is applied to the pin 15 and the keyboard section 2 is pressed against the stopper 14.

When removing the keyboard section 2, the user (or service representative: hereinafter referred to simply as "user") inserts a finger in a hole (not shown) formed in the housing 4 from the underside of the main body 3, and touches the vicinity of the front part 2a from the rear side (internal space A side) of the keyboard section 2. Then, by pressing this part toward the rear part 2b, the user slides the keyboard section 2 toward the rear part 2b (see an arrow (1) in FIG. 7). When the keyboard section 2 slides a predetermined distance, the front part 2a of the keyboard section 2 is freed from the latch section 10, and by rotation of the keyboard section 2 around the rear part 2b still sandwiched between latch section 11 and receiving section 13 in this state, the front part 2a is pushed up, and is freed from the bezel 5 (see an arrow (2) in FIG. 7). If the keyboard section 2 is then pulled toward the front part 2a, the rear part 2b is also pulled out from between latch section 11 and receiving section 13, and as a result the keyboard section 2 is completely removed from the bezel 5 (see an arrow (3) in FIG. 7). The keyboard section 2 can be fitted into the bezel 5 by carrying out the reverse of the above described procedure.

However, with the above described conventional configuration, several problems arise as described below.

As described above, the following operations are necessary in order to remove the keyboard section 2:

(1) Slide toward the rear part 2b (2) Push up toward the front part 2a when freed from latch section 10

(3) Pull out from between latch section 11 and receiving section 13 of the rear part 2b If operation (2) is performed before operation (1), for example, the front part 2a of the keyboard section 2 is not freed from latch section 10, and therefore the keyboard section 2 cannot be removed neatly.

As a result, push-up operation (2) is performed forcibly before slide (1) has been completed—that is, before the front part 2a of the keyboard section 2 has been freed from latch section 10—and the bezel 5 or keyboard section 2 may be damaged.

The present invention takes account of such technical problems, and has as its object the provision of a computer apparatus and keyboard that enable removal of the keyboard section to be carried out more easily and surely.

SUMMARY OF THE INVENTION

Based on this object, in a computer apparatus of the present invention the keyboard section is fitted to the housing in a removable manner, and this housing comprises a latch section that latches the keyboard section and a guide section that performs guidance so that the keyboard section is kept clear of the latch section when removed from the housing. More specifically, the latch section has a latch surface that is formed so as to project from the housing toward the inside of the aperture for accommodating the keyboard section, and latches the keyboard section. The guide section has a guide surface that is formed so as to project from the housing toward the inside of the aperture and, from base-end to tip-end, slopes from the inside (bottom surface side of the keyboard section) to the outside (surface side of the keyboard section) of the housing. This kind of computer apparatus can be a so-called notebook type in which the control unit is incorporated below the keyboard section inside the housing.

For the keyboard of the present invention, a window that supports a base is formed in the bezel, in which window is formed a first supporting section that supports one side of the base and a second supporting section that supports the other side, and the second supporting section has a latch member whose bottom surface is a sloping surface that rises gradually from base-end to tip-end.

This second supporting section can further have another latch member whose bottom surface is a flat surface. In this case, as regards the bottom surface of the latch member, it is desirable for the base-end to be positioned lower than the bottom surface of the other latch member. Also, it is desirable for the latch member to be formed more toward the center part of the keyboard than the other latch member. By this means, when the vicinity of the center part of the keyboard is raised in order to remove the keyboard, the base first hits the latch section that has a sloping surface.

This kind of keyboard can be applied to a standalone keyboard and also to a computer apparatus or other device of such form as to have a control unit below the base.

The present invention can be taken as a keyboard unit comprising a bezel fitted to its periphery, and as regards this keyboard unit, a supporting section that supports the keyboard section is formed on the bezel, and a guide section is formed that, when one side of the keyboard section is raised from below in an upward direction, slides it toward the other side of the keyboard section and moves the one side diagonally upward, thereby releasing support of that keyboard section by means of the supporting section. This guide section can be formed on the bezel side, or can be formed on the keyboard section side.

It is desirable for this guide section to be formed so as to project toward the inside of the aperture formed in the bezel, and to gradually decrease in thickness from base-end to tip-end.

Also, if the supporting section and guide section are formed consecutively on the surface of the bezel, a design is possible whereby the user is not made aware of the function of the supporting section and guide section.

The present invention can be taken as a bezel fitted to the periphery of a keyboard unit, comprising, on one side of the aperture for accommodating the keyboard section, a first latch member whose bottom surface is a flat surface, and a second latch member whose bottom surface is a sloping section that rises gradually from base-end to tip-end.

At this time, a third latch member that extends from the periphery of the aperture toward one side of the aperture can be further provided on the other side of the aperture.

Also, a wall section that is virtually orthogonal to the surface of the bezel can be further provided on one side of the aperture, and on the lower part of this wall section, an extending section that extends toward the other side of the aperture can be provided, and the keyboard section can be received by this extending section. Moreover, if the keyboard section accommodated in the aperture is forced toward the wall section by a forcing section, the keyboard section can be positioned at this wall section.

BRIEF DESCRIPTION OF THE DRAWINGS

Hereafter, the present invention will be described in detail in accordance with the embodiment(s) shown in the accompanying drawings, in which.

DETAILED DESCRIPTION OF THE INVENTION

Figure 1:
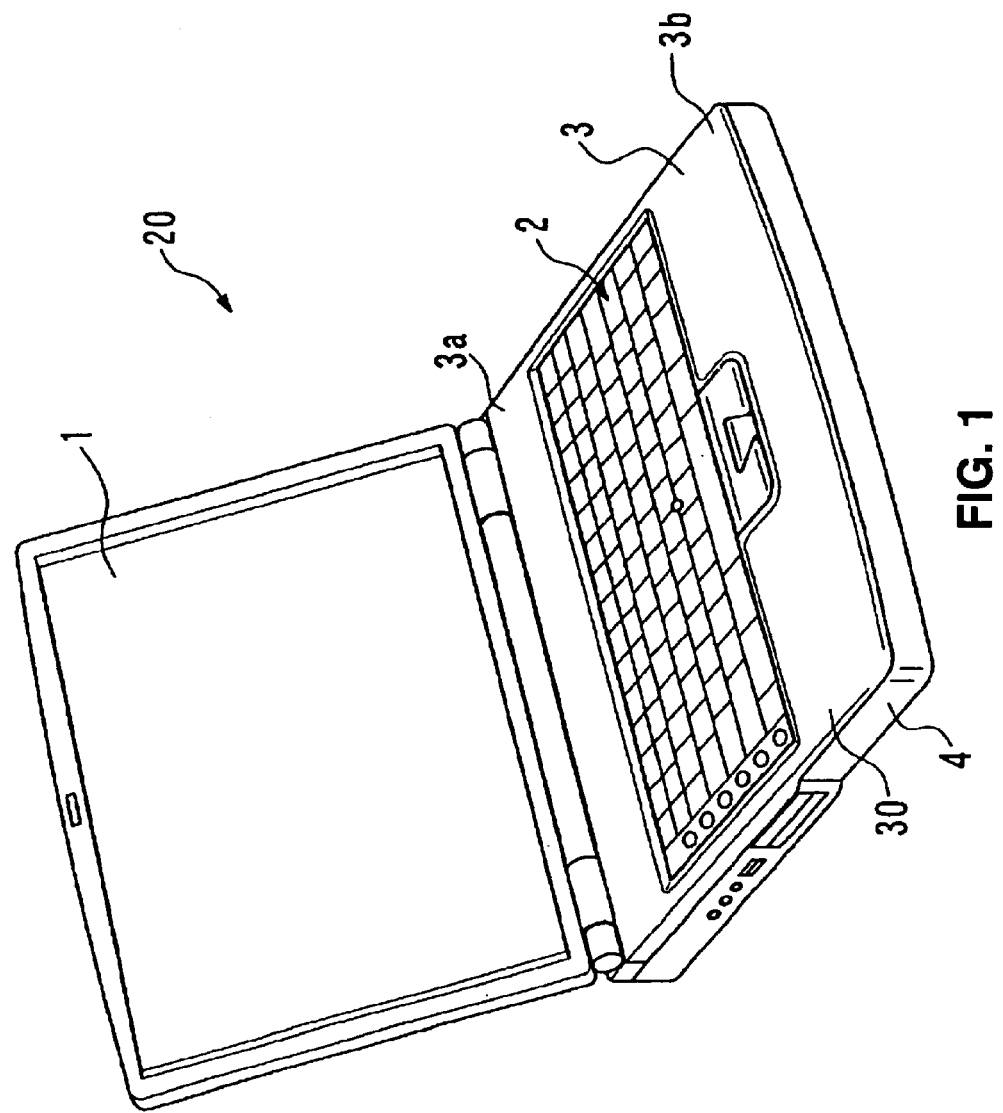
FIG. 1 is a drawing showing a configuration of a PC according to this embodiment.

As shown in FIG. 1, a notebook PC (computer apparatus) 20 has a configuration in which a monitor section (display unit) 1 displaying an image and a main body 3 provided with a keyboard section 2 are linked so as to allow opening and closing. The main body 3 has an aperture in the top, and comprises a tray-shaped housing 4 that accommodates a motherboard, HDD, memory, and similar control units, a keyboard section 2 as input means, and a bezel 30 fitted to the top of the housing 4 and positioned around this keyboard section 2.

In this embodiment the direction from side 3a on which the main body 3 is linked to the monitor section 1 to side 3b opposite is called the "front-back direction" and the direction orthogonal to this is called the "lateral direction".

Figure 7:
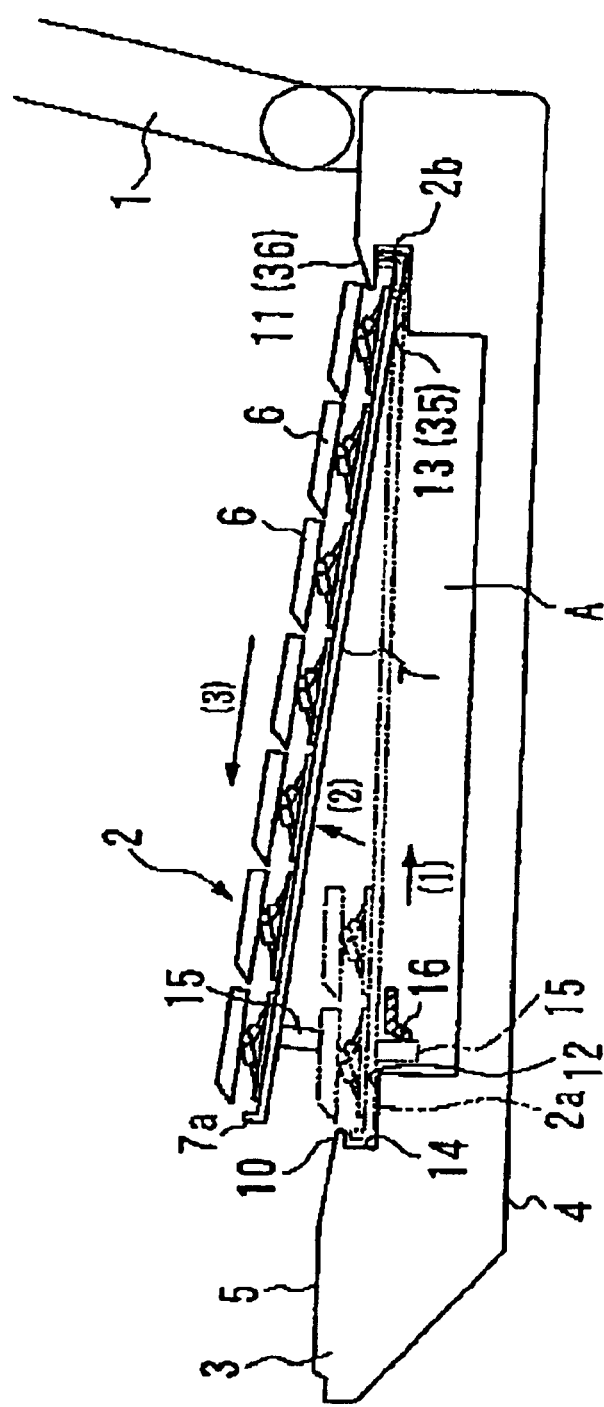
FIG. 7 is a drawing showing movements when the keyboard section is detached from the bezel in the case of conventional construction.

The keyboard section 2 has the same configuration as shown in FIG. 7, being a unit formed by the attachment of a plurality of keys 6 which are vertically movable and circuit boards (not shown) to a base panel (base) 7.

Here, the base panel 7 has an external shape corresponding to the arrangement of the plurality of keys 6, and a peripheral wall section 7a rising to a predetermined height is formed on virtually its entire periphery.

Figure 2:
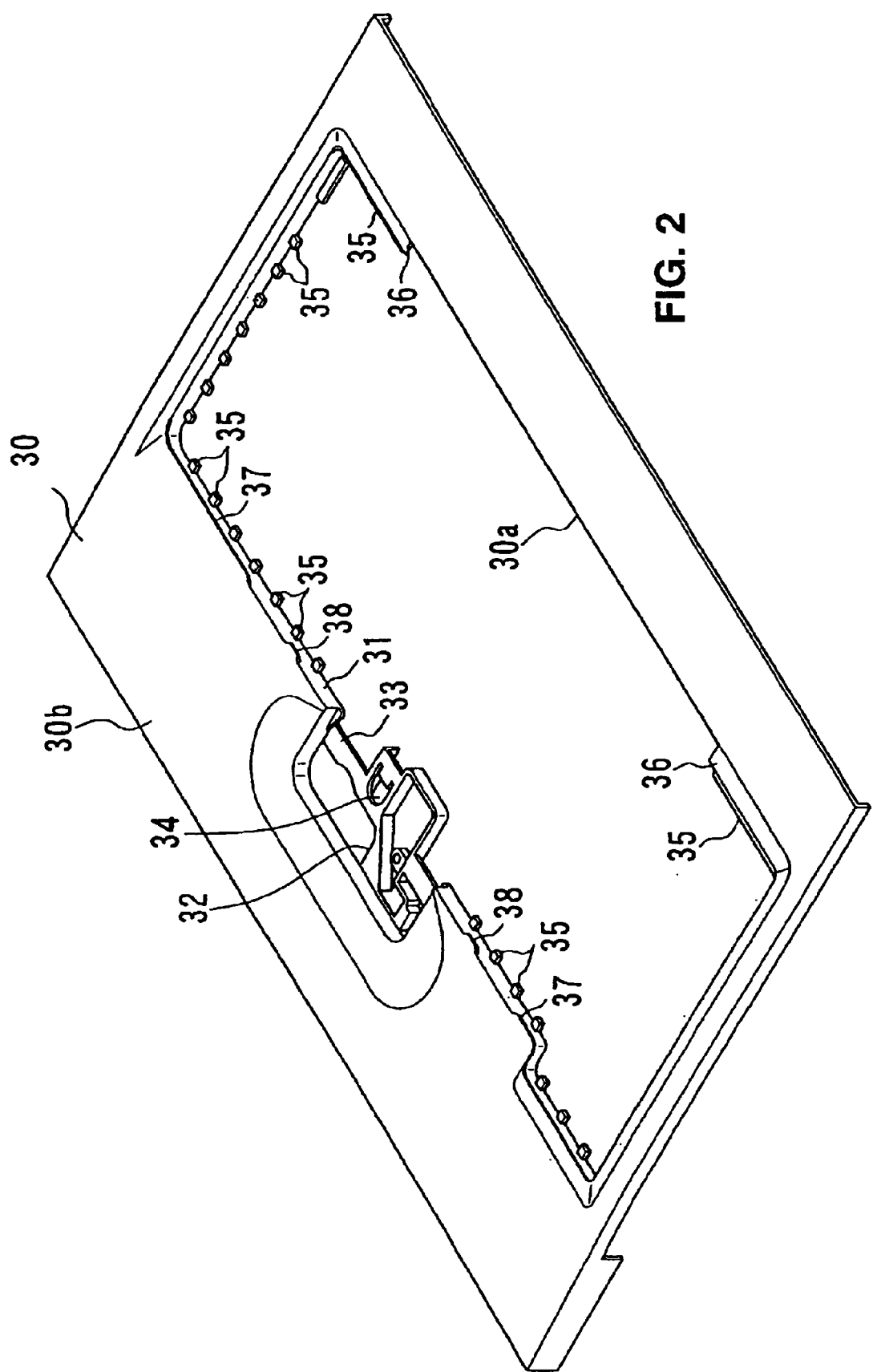
FIG. 2 is an oblique drawing showing a configuration of the bezel of a keyboard section of a PC.

As shown in FIG. 2, the bezel 30 has an aperture (window) 30a following the external shape of the keyboard section 2. On this aperture 30a is formed, around almost the entire periphery of the aperture 30a, a peripheral wall (stopper, wall section) 31 that faces the rear surface of the bezel 30 and extends in a virtually orthogonal direction with respect to the face surface 30b of the bezel 30 that forms a surface that is exposed on the user side on the outer periphery of the keyboard section 2.

Also, as shown in FIG. 2 and FIG. 3A, there is fitted on the bezel 30, in the center part in the lateral direction and in a position that is at the front in the front-back direction when the user is facing the PC 20, a bridge 33 positioned so as to extend toward the inside of the aperture 30a from the peripheral wall 31 in order to form an insertion hole 32 into which the user inserts a finger when removing the keyboard section 2. Moreover, in this bridge 33 is formed a hole 34 for the passage of a pin 15 fitted to the rear surface of the keyboard section 2, and a positioning claw (pressing member, forcing section) 16 is formed in this hole 34 so as to project downward. As shown in FIG. 3B, this positioning claw 16 is formed so as to slope in a predetermined direction toward the lower part 16a (a direction such that the lower part 16a extends into the hole 34), and when the pin 15 of the keyboard section 2 passes through the hole 34, this pin 15 is pressed in a predetermined direction by the force generated by its own elastic deformation.

As shown in FIG. 2, receiving sections (extending sections) 35 that receive the base panel 7 of the keyboard section 2 are formed on the lower part of the peripheral wall 31, at a plurality of places around it, projecting toward the inside of the aperture 30a. In this embodiment, the receiving sections 35 are configured so as to be provided at virtually predetermined intervals at a plurality of places around the peripheral wall 31, but this is not a limitation, and continuous formation around the peripheral wall 31 is also possible.

In the aperture 30a of the bezel 30, there is formed on the side opposite the side on which the bridge 33 is provided (on the side on which the main body 3 and monitor section 1 are linked in FIG. 1) latch sections (first supporting sections, supporting sections, third latch members) 36 that extend in a visor shape toward the side on which the bridge 33 is provided, consecutive to the upper part of the peripheral wall 31—that is, the face surface 30b of the bezel 30. These latch sections 36 are provided on both sides in the lateral direction of the aperture 30a.

By this means, one side of the keyboard section 2, in the same way as in the case in FIG. 7, is supported by being sandwiched above and below between the receiving sections 35 and latch sections 36.

Meanwhile, in the aperture 30a, there are provided, on the side on which the bridge 33 is provided, first latch sections (latch sections, second supporting sections, supporting sections, first latch members) 37 and second latch sections (guide sections, second supporting sections, latch members, second latch members) 38 consecutive to the upper part of the peripheral wall 31—that is, the face surface 30b of the bezel 30.

Figure 4:
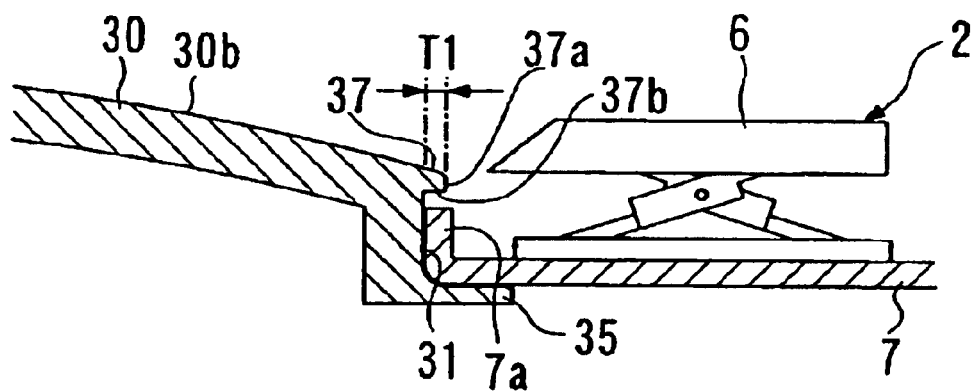
FIG. 4A is a drawing showing a latched state of a first latch section and the keyboard section.
FIG. 4B is a drawing showing a latched state of a second latch section and the keyboard section.
Figure 4:
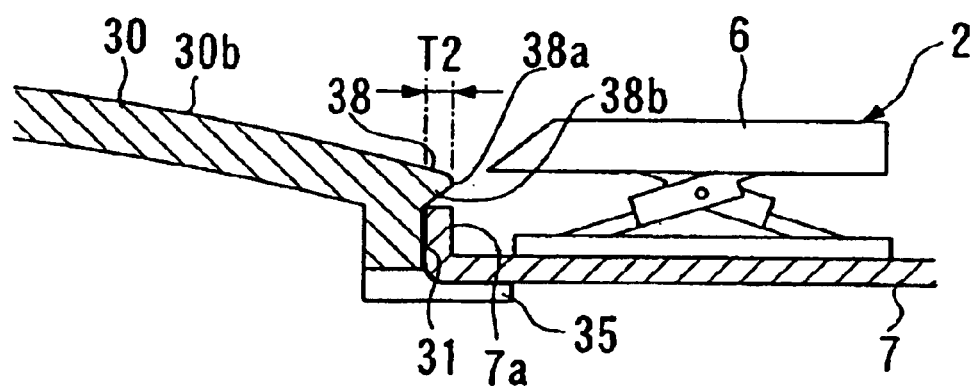
Figure 5:
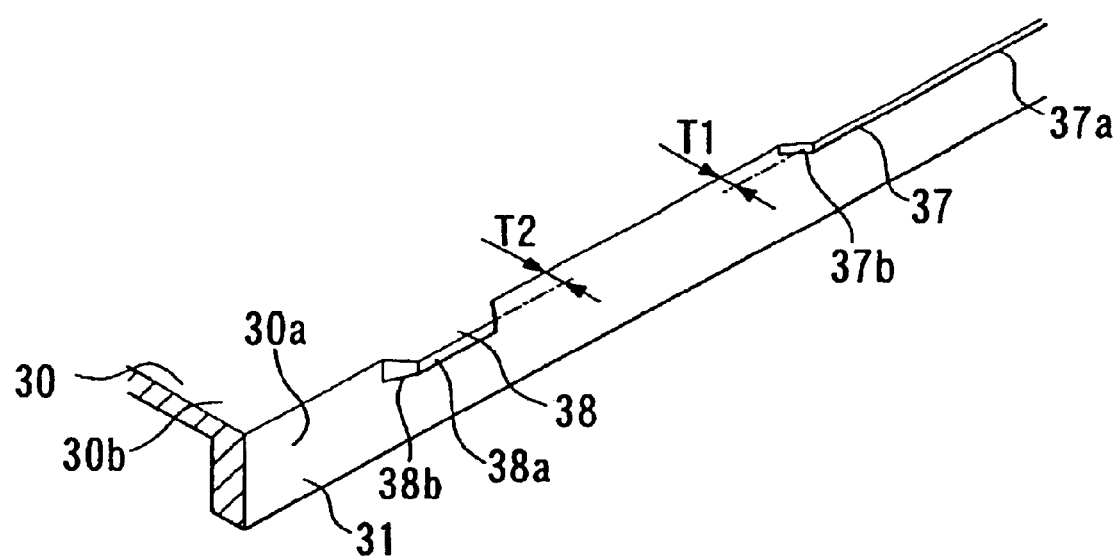
FIG. 5 is an oblique drawing showing a first latch section and second latch section formed on the bezel.

The first latch sections 37 are formed on both sides of the aperture 30a in the lateral direction. As shown in FIG. 4A and FIG. 5, first latch sections 37 are formed so that the tip-end 37a is a predetermined distance T1 from the peripheral wall 31. Also, these first latch sections 37 are formed so that the bottom surface (latch surface) 37b is virtually orthogonal to the peripheral wall 31.

As shown in FIG. 2, second latch sections 38 are formed in the lateral direction of the aperture 30a at two places a predetermined distance further toward the center part than the first latch sections 37 on both sides. That is, the configuration is such that second latch sections 38 are provided on the nearer side on both sides of the insertion hole 32 formed in the bridge 33, and first latch sections 37 are further provided on the outer side.

As shown in FIG. 4B and FIG. 5, these second latch sections 38 are formed so that the tip-end 38a is a predetermined distance T2 from the peripheral wall 31. Here, a relationship T1<T2 is desirable between distance T1 in the first latch sections 37 and distance T2 in the second latch sections 38, and it is further desirable for a difference of around 0.2 mm, for example, to be provided between distances T1 and T2.

The bottom surface (guide surface, sloping surface, sloping section) 38b of a second latch section 38 is not virtually orthogonal to the peripheral wall 31 as with the bottom surface 37b of a first latch section 37, but is formed so as to slope at a predetermined angle with respect to the peripheral wall 31. Here, the bottom surface 38b is formed so as to gradually approach the face surface 30b from the rear surface of the bezel 30 in the direction from the base (base-end) of the peripheral wall 31 side to the tip-end 38a. More exactly, for the bottom surface 38b, a sloping surface is formed so as to be positioned lower than the bottom surface 37b of the first latch section 37 in the part touching the peripheral wall 31 at the base of the second latch section 38, and to be virtually the same height as the bottom surface 37b of the first latch section 37 on the tip-end 38a side.

Now, the effective aperture of the aperture 30a of the bezel 30 is not formed by the peripheral wall 31, but strictly speaking, as described above, is formed by the latch sections 36, first latch sections 37, and second latch sections 38, projecting inward from this peripheral wall 31. Thus, the aperture 30a has a configuration with an aperture size that is a predetermined dimension smaller than the base panel 7 of the keyboard section 2 in the front-back direction according to the latch sections 36, first latch sections 37, and second latch sections 38. On the other hand, no projections whatever are provided on either side in the lateral direction in the aperture 30a, and the aperture size is virtually the same as (slightly larger than) the base panel 7 of the keyboard section 2.

The keyboard section 2 is fitted to the bezel 30 with this kind of configuration as described below.

As shown in FIG. 7, the keyboard section 2 has its rear part 2b supported by being sandwiched above and below between receiving sections 35 and latch sections 36, and its front part 2a supported by being sandwiched above and below between the receiving sections 35 and the first latch sections 37 and the second latch sections 38.

Figure 3:
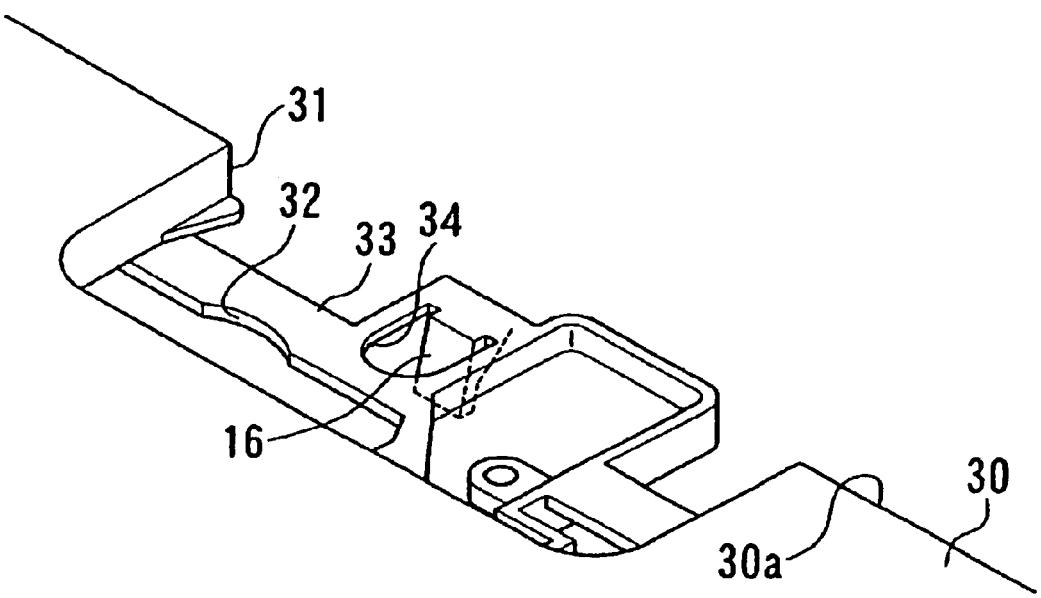
FIG. 3A is a drawing showing a positioning claw formed on the bezel.
FIG. 3B is a drawing showing the state in which the keyboard section is pressed to one side by a positioning claw.
Figure 3:
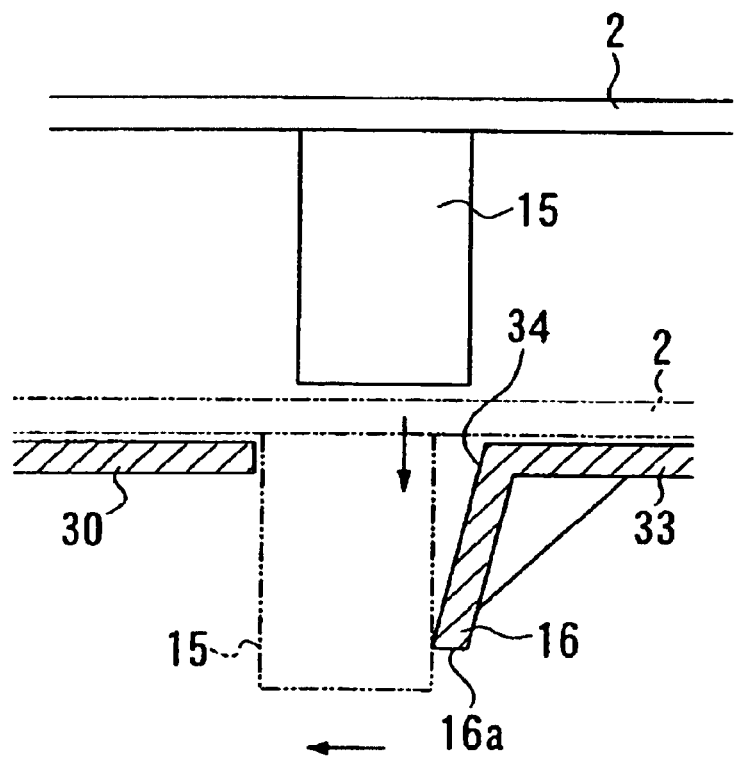

In this state, as shown in FIG. 3, with regard to the keyboard section 2 the pin 15 projecting downward is located within the hole 34 in the bridge 33, the pin 15 is pressed upon by the positioning claw 16 sloping in a predetermined direction, and as a result the front part 2a of the keyboard section 2 (front part of the base panel 7) is positioned by being pressed against the peripheral wall 31. Also, the upper part of the peripheral wall section 7a of the base panel 7 of the keyboard section 2 is positioned lower than the base of the bottom surface 38b of the second latch sections 38.

Figure 6:
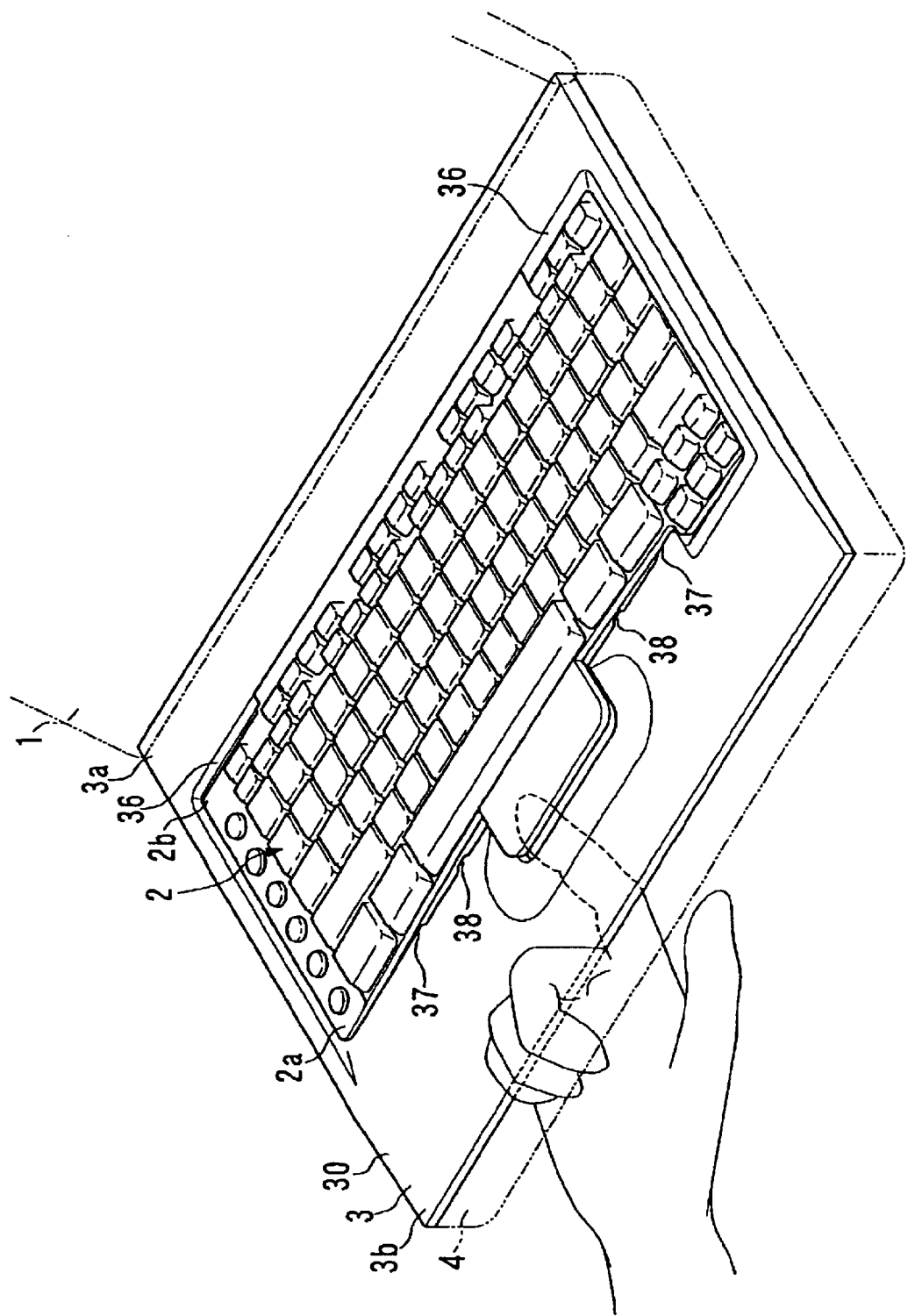
FIG. 6 is a drawing showing the state where the keyboard section is detached from the bezel.

Now, as shown in FIG. 6, to remove the keyboard section 2 from the bezel 30, the user inserts a finger into a hole (not shown: formed in the battery pack installation section, etc.) formed in the housing 4 from the underside of the main body 3. Then, when that finger is positioned in a part of the insertion hole 32 formed by means of the bridge 33 of the bezel 30, it is possible to touch the rear side of the front part of the base panel 7 of the keyboard section 2.

Then, when the user pushes this part upward with that finger, the top of the peripheral wall section 7a of the base panel 7 of the keyboard section 2 is pressed against the bottom surface 38b of the second latch sections 38 located at either side of the part pushed upward. When this happens, since the bottom surface 38b of each second latch section 38 is a sloping surface, the base panel 7 is pushed upward at an angle, guided by this bottom surface 38b. Along with this, the base panel 7 also moves upward at an angle as a unit in the area of the first latch sections 37 corresponding to those two sides in the lateral direction.

As a result, when the peripheral wall section 7a of the base panel 7 has moved as far as the tip-end 38a of each second latch section 38, it is released from the latched state due to the second latch sections 38. At virtually the same time as this, the peripheral wall section 7a of the base panel 7 is released from the latched state due to the first latch sections 37 on either side.

In the above described operations, the part of the base panel 7 pushed by the user's finger—that is, the vicinity of the center part in the lateral direction of the base panel 7—actually bends into a state in which it is pushed upward further than both sides, and therefore is guided by first hitting the bottom surface 38b of the second latch sections 38 from the center. By this means, sliding in a backward sloping direction of the base panel 7—that is, the keyboard section 2—is performed surely.

Thus, as a result of the front part 2a of the keyboard section 2 moving upward at a slope (backward at a slope) following the bottom surface 38b of the second latch sections 38, although the keyboard section 2 continues to turn centered on the rear part 2b still sandwiched between the latch sections 36 and receiving sections 35, sliding toward the rear occurs at the rear part 2b. Then, if the keyboard section 2 is pulled toward the front part 2a when the front part 2a is freed from the first latch sections 37 and second latch sections 38 of the bezel 30, the rear part 2b also is pulled out from between the latch sections 36 and receiving sections 35, and by this means the keyboard section 2 is completely removed from the bezel 30.

According to a configuration of the kind described above, the second latch sections 38 with the bottom surface 38b that is a sloping surface are provided on a bezel 30, so that it is possible for the keyboard section 2 to slide backward on a slope and latching of the front part 2a of the keyboard section 2 by first latch sections 37 and second latch sections 38 to be released simply by pushing upward with a finger. By this means, it is possible for the user to release the keyboard section 2 by means of a one-touch operation instead of sliding the keyboard section 2 by a process of feeling around. As a result, it is possible for the user himself or herself to carry out various kinds of tasks such as memory expansion or the like easily and surely.

In the above described embodiment, a configuration is used whereby second latch sections 38 whose bottom surface 38b is a sloping surface are provided toward the center part of a keyboard section 2, and the first latch sections 37 are provided on the outer side thereof, but this is determined based on the relationship to the place where force is applied at the time of removing the keyboard section 2. Therefore, if both sides of the keyboard section 2 are pushed upward, for example, the second latch sections 38 whose bottom surface 38b is a sloping surface may be provided nearer the location at which force is applied.

Also, if a secure latched state can be maintained such that the keyboard section 2 does not become detached unnecessarily in the normal state with only the second latch sections 38 whose bottom surface 38b is a sloping surface, the first latch sections 37 whose bottom surface 37b is a flat surface can be omitted.

In addition, in the above described embodiment, the first latch sections 37 and the second latch sections 38 are provided toward the front of the keyboard section 2 as seen by a user facing the PC 20, but this is not necessarily a limitation, and these may be provided at the rear (monitor section 1 side) of the keyboard section 2, or may be provided on both sides or one side with respect to the lateral direction of the keyboard section 2.

Moreover, in the above described embodiment, the example of a so-called notebook PC has been given for the PC 20, but this is not a limitation, and the same kind of configuration can also be applied to a standalone keyboard, a keyboard used for a device other than a PC, and so forth.

The above described embodiment is an example of the preferred embodiment of the present invention. However, the present invention is not limited to the above described embodiment, and various modifications are possible without departing from the object of the present invention.

What is claimed is:

1. A computer apparatus, comprising:

a display unit that displays images;

a control unit that controls the operation of the computer apparatus and the display contents on said display unit; and a keyboard section as an input unit for said control unit; wherein:
said keyboard section is fitted in a removable manner to a housing of said computer apparatus; and
wherein said housing comprises:
an aperture that accommodates said keyboard section;
a latch section having a predominately flat latch surface projecting from said housing towards the inside of said aperture that latches said keyboard section; and
a guide section having a guide surface projecting from said housing toward the inside of said aperture and which, from base-end to tip-end, slopes from the inside to the outside of said housing and which performs guidance so that said keyboard section is kept clear of said latch section when said keyboard section is removed from said housing.

2. The computer apparatus according to claim 1, wherein said control unit is incorporated below said keyboard section and within said housing.

3. A keyboard provided with a plurality of keys, comprising:

a base that supports vertically movable keys; and a bezel that has a window that holds said base;

wherein in said window are formed a first supporting section that supports one side of said base and a second supporting section that supports the other side of said base; end said second supporting section is formed so as to project inward from said window, and comprises a first latch member whose bottom surface is a sloping surface that rises gradually from base-end to tip-end and a second latch member whose bottom surface is a flat surface.

4. The keyboard according to claim 3, wherein the base-end of the bottom surface of said first latch member is positioned lower than the bottom surface of said second latch member.

5. The keyboard according to claim 3, wherein said first latch member and said second latch member are formed respectively on both sides with respect to the center part of said keyboard; and said first latch member is formed more toward said center part of said keyboard than said second latch member.

6. The keyboard according to claim 3, wherein said first supporting section allows movement of said base from said second supporting section side toward said first supporting section;

said second supporting section has a stopper that restricts movement of said base from said first supporting section side toward said second supporting section; and said bezel comprises a pressing member that presses said base against said stopper.

7. A keyboard unit consisting of a keyboard section comprising a plurality of vertically movable keys and a bezel fitted around said keyboard section;

wherein on said bezel is formed a supporting member for supporting said keyboard section; and on said bezel or on said keyboard section is formed a guide member that, when one side of said keyboard section is raised from below in an upward direction, guides said keyboard section toward the other side of said keyboard section and moves said one side of said keyboard section diagonally upward, thereby releasing support of said keyboard section by said supporting member.

8. The keyboard unit according to claim 7, wherein said bezel has an aperture that accommodates said keyboard section; and said guide member is formed so as to project from said housing toward the inside of said aperture, and gradually decreases in thickness from base-end to tip-end.

9. The keyboard unit according to claim 7, wherein said bezel has an insertion hole into which a user inserts a finger when raising said keyboard section; and said guide member is located nearer said insertion hole than said supporting member.

10. The keyboard unit according to claim 7, wherein said supporting member and said guide member are positioned consecutively on the surface of said bezel.

11. A bezel that is fitted around a keyboard, comprising:

an aperture that accommodates said keyboard;

a first latch member extending from the periphery of a first side of said aperture toward a second, opposite side of said aperture and whose bottom surface is a flat surface; and a second latch member extending from the periphery of said first side of said aperture toward said second, opposite side of said aperture and whose bottom surface is a sloping surface that rises gradually from base-end to tip-end.

12. The bezel according to claim 11, further comprising, on said second side of said aperture, a third latch member that extends from the periphery of said aperture toward said first side of said aperture.

13. The bezel according to claim 11, further comprising, on said first side of said aperture, a wall section that is virtually orthogonal to the surface of said bezel.

14. The bezel according to claim 13, further comprising, on the lower part of said wall section, an extending section that extends toward said second side of said aperture.

15. The bezel according to claim 13, further comprising a forcing section that forces said keyboard accommodated in said aperture toward said wall section.

* * * * *